(12) United States Patent
Pelz et al.

(10) Patent No.: US 12,180,957 B2
(45) Date of Patent: Dec. 31, 2024

(54) SYSTEM COMPRISING AN ELECTRIC MACHINE AND A HYDRAULIC UNIT, AS WELL AS ELECTRIC MACHINE AND HYDRAULIC UNIT

(71) Applicants: Parker-Hannifin Corporation, Cleveland, OH (US); PARKER HANNIFIN EMEA S.À.R.L., Etoy (CH)

(72) Inventors: Raimund Pelz, Chemnitz (DE); Maximilian Keil, Chemnitz (DE); Kyle J. Myers, Hilliard, OH (US); David E. N. Mack, New Ulm, MN (US); Fredrik Magnusson, Trollhättan (SE); Omer Khaleeq Kayani, Vänersborg (SE)

(73) Assignees: Parker-Hannifin Corporation, Cleveland, OH (US); PARKER HANNIFIN EMEA S.À.R.L., Etoy (CH)

( * ) Notice: Subject to any disclaimer, the term of this patent is extended or adjusted under 35 U.S.C. 154(b) by 0 days.

(21) Appl. No.: 18/462,491

(22) Filed: Sep. 7, 2023

(65) Prior Publication Data

US 2023/0417244 A1 Dec. 28, 2023

Related U.S. Application Data

(63) Continuation of application No. PCT/EP2023/052008, filed on Jan. 27, 2023.
(Continued)

(51) Int. Cl.
*F04C 15/00* (2006.01)
*F04D 29/044* (2006.01)
(Continued)

(52) U.S. Cl.
CPC ........ *F04C 15/0073* (2013.01); *F04D 29/044* (2013.01); *F16D 1/101* (2013.01);
(Continued)

(58) Field of Classification Search
CPC .............. F04C 15/0073; F04D 29/044; F04D 13/0646; F16D 1/101; F16D 2001/103; F16D 2300/06; H02K 7/003
(Continued)

(56) References Cited

U.S. PATENT DOCUMENTS 7,240,656 B2 7/2007 Yamane et al.
8,579,512 B2 * 11/2013 Radinger ............... H02K 7/003
464/7

(Continued)

FOREIGN PATENT DOCUMENTS

DE 10 2016 225 196 A1 6/2018
JP 2015151973 A 8/2015

*Primary Examiner* — Greg Binda
(74) *Attorney, Agent, or Firm* — Renner, Otto, Boisselle & Sklar, LLP

(57) ABSTRACT

A system includes an electric machine and a hydraulic unit. The electric machine includes a first shaft. The hydraulic unit includes a second shaft and a leakage oil chamber. The first shaft and the second shaft are connected to one another to form the shaft-hub connection. The shaft-hub connection has a central recess and is connected fluidically to the interior of the hydraulic unit for lubrication. The central recess adjoins at least one transverse channel. The at least one transverse channel extends from the central recess to an external circumference of the shaft-hub connection.

15 Claims, 5 Drawing Sheets

Related U.S. Application Data

(60) Provisional application No. 63/414,949, filed on Oct. 11, 2022, provisional application No. 63/304,989, filed on Jan. 31, 2022.

(51) Int. Cl.
  *F16D 1/10* (2006.01)
  *F04D 13/06* (2006.01)
  *H02K 7/00* (2006.01)

(52) U.S. Cl.
  CPC .... *F04D 13/0646* (2013.01); *F16D 2001/103* (2013.01); *F16D 2300/06* (2013.01); *H02K 7/003* (2013.01)

(58) Field of Classification Search
  USPC ............................................................ 464/7
  See application file for complete search history.

(56) References Cited

U.S. PATENT DOCUMENTS

| | | |
|---|---|---|
| 9,309,959 B2 * | 4/2016 | Ishikawa ............... F16H 57/027 |
| 2004/0052667 A1 | 3/2004 | Dong |
| 2010/0193296 A1 | 8/2010 | Sora |
| 2012/0219351 A1 | 8/2012 | Besler et al. |

* cited by examiner

SYSTEM COMPRISING AN ELECTRIC MACHINE AND A HYDRAULIC UNIT, AS WELL AS ELECTRIC MACHINE AND HYDRAULIC UNIT

This application is a bypass continuation of International Application No. PCT/EP2023/052008 filed Jan. 27, 2023, which claims priority to U.S. patent application Ser. No. 63/414,949 filed Oct. 11, 2022, and U.S. patent application Ser. No. 63/304,989 filed Jan. 31, 2022, each of which is hereby incorporated herein by reference in its entirety.

FIELD OF DISCLOSURE

The invention relates to a system which comprises an electric machine with a first shaft and a hydraulic unit with a second shaft. The invention additionally relates to a hydraulic unit and an electric machine for such a system.

BACKGROUND OF THE DISCLOSURE

The electric machine is usually configured as an electric motor and is connected to a hydraulic unit configured as a pump. The electric machine comprises a stator and a rotor connected to the shaft or forming the shaft. However, it can also be provided that the hydraulic unit drives the electric machine as a generator.

In order to transmit the torques between the (first) shaft of the electric machine and the (second) shaft of the hydraulic unit, it is known to provide a so-called bell housing, which spaces the electric machine and the hydraulic unit apart from one another in a connecting manner and inside which a transmission shaft connects the first shaft and the second shaft to one another. The bell housing and the transmission shaft have the advantage that the electric machine and the hydraulic unit can be aligned with respect to one another to a certain extent during assembly so that the manufacturing tolerances in particular relative to the bearings of the first shaft of the electric machine and the bearings of the second shaft of the hydraulic unit can be compensated. A disadvantage however is that the length of the entire system (in the direction of the direction of extension of the shafts) is substantially increased by the bell housing and the transmission shaft. In addition, a large number of parts with corresponding assembly expenditure and costs is necessary to construct the complete system.

In order to construct a more compact system which requires fewer components, it is known to insert the first shaft of the electric machine and the second shaft of the hydraulic unit directly into one another thereby forming a positive and direct shaft-hub connection. Such a more compact system is known, for example, from DE 10 2016 225 196 A1. It is proposed there that the shaft-hub connection is lubricated by means of the hydraulic fluid conveyed by the hydraulic unit. For this purpose a leakage oil channel running in the axial direction of the pump shaft is proposed, which extends over the entire length of the pump shaft. Hydraulic fluid which passes from a pressurized conveying chamber of the pump along a bearing of the pump head into a leakage oil chamber inside the hydraulic unit can thus enter into the end of the leakage oil channel which is disposed at the front-side end of the pump shaft inside the hydraulic unit. The leakage oil flowing through the central leakage oil channel, after exit from the leakage oil channel at the end assigned to the shaft-hub connection flows along the shaft-hub connection and lubricates the shaft-hub connection. In order to facilitate this leakage oil flow, a drain is proposed through which the leakage oil drains off after lubrication of the shaft-hub connection. A separate drain is therefore required which must be formed between the electric machine and the hydraulic unit or in the electric machine. An apparative adaptation of the electric machine or an adapter piece disposed between the electric machine and the hydraulic unit is therefore necessary.

SUMMARY OF DISCLOSURE

It is therefore the object of the present invention to provide a system comprising an electric machine and a hydraulic unit as well as an electric machine and a hydraulic unit by means of which it is possible to further integrate the leakage oil drain in the hydraulic unit.

The object is achieved by a system, a hydraulic unit, an electric machine and an intermediate shaft having the features of the respective independent claim. Advantageous further developments of the system, the hydraulic unit, the electric machine and the intermediate shaft are specified in the dependent claims and in the description, wherein individual features of the advantageous further developments can be combined with one another in a technically meaningful manner. In particular, the features described with reference to the system can be applied to the hydraulic unit or the electric machine and vice versa.

The object is achieved in particular by a system comprising an electric machine, wherein the electric machine comprises a first shaft, and a hydraulic unit, wherein the hydraulic unit comprises a second shaft, wherein the first shaft and the second shaft are connected to one another to form a preferably positive locking shaft-hub connection, the shaft-hub connection comprises a central recess and the shaft-hub connection is fluidically connected to an interior of the hydraulic unit for lubrication, wherein the central recess adjoins at least one transverse channel which extends from the central recess to an external circumference of the shaft-hub connection.

The object is also achieved by a hydraulic unit, wherein a shaft of the hydraulic unit has a central recess and at least one transverse channel, and the at least one transverse channel extends from the central recess to an external circumference of the shaft.

The object is also achieved by an electric machine, wherein a shaft of the electric machine has a central recess and at least one transverse channel, wherein the at least one transverse channel extends from the central recess to an external circumference of the shaft.

The object is also achieved by an intermediate shaft for connecting the first shaft and the second shaft of such a system, wherein the intermediate shaft has a central recess and at least one transverse channel, wherein the at least one transverse channel extends from the central recess to an external circumference of the intermediate shaft.

The invention will be discussed hereinafter with reference to the system. However, the embodiments described also explicitly relate to the independent hydraulic unit, the independent electric machine and the independent intermediate shaft.

In an embodiment of the system the first shaft and the second shaft are inserted directly into one another to form the shaft-hub connection, in which case the first shaft or the second shaft comprises the central recess, wherein the at least one transverse channel extends from the central recess to an external circumference of the respective shaft. Preferably, the central recess and the at least one transverse channel are formed in the second shaft of the hydraulic unit.

The first shaft and the second shaft may be directly inserted into one another to form the shaft-hub connection so that no further components (such as bell housing and transmission/intermediate shaft) need to be provided in order to connect the shaft of the electric machine to the shaft of the hydraulic unit.

In an alternative embodiment the first shaft and the second shaft may be indirectly connected by an intermediate shaft. In this case, the shaft-hub connection comprises an intermediate shaft for connecting the first shaft and the second shaft, wherein the central recess and the at least one transverse channel may be formed in the intermediate shaft.

Preferably a plurality (at least two, preferably at least four, particularly preferably no more than eight) of transverse channels adjoin the central recess, which extend in particular rectilinearly in each case from the central recess to an external circumference of the shaft. The at least one transverse channel can extend outwards strictly in the radial direction and therefore at a right angle to a longitudinal axis of the shaft. However, it is also possible that the at least one transverse channel is aligned at a different angle to the longitudinal axis of the shaft. The transverse channel(s) can, for example, be formed by a bore.

The invention is based on the finding that fluid located in the at least one transverse channel (in particular leakage oil from a leakage oil chamber of the hydraulic unit) is subjected to a centrifugal force during operation of the system, whereby fluid can be conveyed from the central recess into a chamber surrounding the external circumference of the shaft, wherein fluid can be sucked in as a result of the negative pressure formed thereby in the recess, with the result that a specific conveying direction of the fluid is predefined.

In other words: the invention provides in its basic idea that the first shaft of the electric machine, the second shaft of the hydraulic unit or the intermediate shaft has transverse channels running outwards in particular in the radial direction for conveying the leakage oil along the shaft-hub connection. Thus, leakage oil can be specifically conveyed for lubrication of the contact points between the shafts and in particular can be circulated back into a leakage oil chamber of the hydraulic unit. Thus, no additional drain is required for leakage oil.

In one embodiment, it can be provided, for example, that the hydraulic unit comprises a leakage oil chamber. The leakage oil chamber is in particular a chamber inside the hydraulic unit into which hydraulic oil enters during operation from the pressurized conveying chamber of the hydraulic unit. For example, hydraulic fluid enters along bearings of the components conveying the pressurized hydraulic fluid. In this case, the central recess can be disposed in the (second) shaft of the hydraulic unit or in the intermediate shaft, wherein the at least one transverse channel extends from the central recess to the leakage oil chamber. The recess is preferably formed in the (second) shaft of the hydraulic unit as an axial channel and extends from the at least one transverse channel through the second shaft to the direct shaft-hub connection. Alternatively, the central recess may be formed in the in the intermediate shaft as an axial channel and extends from the at least one transverse channel through the intermediate shaft to a front-side end of the intermediate shaft. The axial channel extending in the axial direction of the shaft therefore has an inlet at a front-side end facing the electric machine through which leakage oil (after lubricating the shaft-hub connection) can enter into the axial channel. Therefore, the axial channel does not extend completely through the second shaft or through the intermediate shaft. Accordingly, the axial channel is to be considered a blind hole extending from the front-side end through the shaft to the at least one transverse channel.

In an alternative embodiment, it can be provided that the (first) shaft of the electric machine has the recess and the adjoining at least one transverse channel. In this case, the recess is arranged in particular directly adjoining a receptacle for the (second) shaft of the hydraulic unit or for the intermediate shaft. In this embodiment, leakage oil which has already flowed along the contact points of the shaft-hub connection is conveyed through the (first) shaft of the electric machine into the chamber surrounding the shaft.

Preferably in this embodiment, it is possible that a separate drain is provided for the leakage oil conveyed through the at least one transverse channel of the first shaft of the electric machine.

It is also preferably provided that the at least one transverse channel ends at a point on the external circumference of the shaft which does not overlap with the other shaft in the connected state. The at least one transverse channel is therefore arranged axially offset with respect to the shaft-hub connection in one of the shafts. It is thereby ensured that leakage oil can be conveyed from the leakage oil chamber inside the hydraulic unit along the shaft-hub connection arranged outside a housing of the hydraulic unit.

In one embodiment it is preferably provided that the shaft-hub connection is connected fluidically outside the second shaft via at least one passage to a leakage oil chamber inside of the hydraulic unit. A first passage or a first group of such passages is provided so that leakage oil flows out from the leakage oil chamber inside the hydraulic unit to the shaft-hub connection.

Such a first passage can be implemented, for example, by mounting the (second) shaft of the hydraulic unit without a shaft seal in a housing of the hydraulic unit in a direction towards the shaft-hub connection. In this case, therefore, leakage oil flows from the leakage oil chamber along the surface of the (second) shaft through the housing of the hydraulic unit in the direction of the shaft-hub connection. In the case of the first embodiments described above, according to which the central recess and the at least one transverse channel are formed in the (second) shaft of the hydraulic unit or in the intermediate shaft, the fluid that has come from the leakage oil chamber enters into the axial channel in the second shaft (or in the intermediate shaft) after it has flowed along contact points of the shaft-hub connection. In the second embodiment described above, according to which the central recess and the at least one transverse channel are formed in the (first) shaft of the electric machine, the fluid that has come from the leakage oil chamber along the second shaft is conveyed into a chamber surrounding the first shaft.

A passage for the fluidic connection of the leakage oil chamber inside the hydraulic unit and the shaft-hub connection can additionally or alternatively be formed by at least one, preferably a plurality of opening(s) (which is/are formed in particular as a recess and preferably as a hole), which is/are disposed adjacent to the second shaft in a housing or a housing component (for example, in a cover cap or a bearing) of the hydraulic unit. In the case of the first embodiments described above, the leakage oil can flow out from the leakage oil chamber through the at least one opening in the housing to the shaft-hub connection and then into the axial channel in the second shaft or in the intermediate shaft. In the case of the second embodiment described above, the leakage oil conveyed through the at least one transverse channel can flow back through the opening into the leakage oil chamber. In this connection it is preferable if a front end face of the first shaft is sealed with respect to the hydraulic unit so that leakage oil can flow from the leakage oil chamber inside the hydraulic unit along the outside of the shaft and along the shaft-hub connection to the recess in the (first) shaft of the electric machine and from there can be conveyed back through the at least one transverse channel to the openings in the housing, which are radially outwardly offset in relation to the sealed end face of the shaft, into the leakage oil chamber.

Preferably the at least one opening can be closed and preferably has an internal thread for this purpose. Thus, in a delivery state the opening can be closed by, for example, a screw. In this case, the opening can be closed until shortly before attachment of the hydraulic unit to the electric machine.

In a preferred embodiment, the shaft-hub connection has a splined connection, wherein the spline connection comprises at least one pin having an external toothed structure and at least one receptacle having an internal toothed structure.

The pin preferably having the external toothed structure can be formed on the first shaft of the electric machine in which case the receptacle having the internal toothed structure is preferably disposed on a front-side end of the second shaft of the hydraulic unit.

Alternatively, the pin preferably having the external toothed structure can be formed on the (second) shaft of the hydraulic unit, in which case the receptacle preferably having the internal toothed structure is disposed on a front-side end of the (first) shaft of the electric machine.

In an even further embodiment, the first shaft of the electrical machine and the second shaft of the hydraulic unit may each comprise a receptacle on its front-side ends preferably having the internal toothed structure, wherein the intermediate shaft forms two pins each having an external toothed structure for insertion into the receptacles, in case the first shaft is connected to the second shaft via the intermediate shaft.

In order to fix the electric machine on the hydraulic unit, a housing of the electric machine and a housing of the hydraulic unit can be connected to one another in a suitable manner (for example, by corresponding screw connections) for example, by forming at least one flange or a cover cap.

The first shaft is in particular mounted by means of two bearings in the electric machine. The second shaft is in particular mounted by means of two bearings in the hydraulic element. In particular, if the pin with the external toothed structure is formed on the second shaft of the hydraulic unit, the pin projects beyond one of the bearings and beyond the housing of the hydraulic unit in the direction of the electric machine.

When specifically implementing the system, it has been found that the internal toothed structure and the external toothed structure of the spline connection are severely worn. The background of this severe wear could be that as a result of the forces acting on the shaft inside the hydraulic unit during operation, it can occur that the pin projecting beyond the bearing is deflected from its neutral position and thus does not maintain its position/alignment in the rest state in the receptacle of the electric machine. Another reason for the severe wear could be that as a result of tolerances of the electric machine or of the hydraulic unit, when connecting the electric machine to the hydraulic unit the pin in the receptacle does not occupy the desired position/alignment.

It has been shown that in order to reduce the wear of the spline connection inter alia, a certain ratio range of pitch circle diameter to external toothed structure length of the external toothed structure on the pin is advantageous.

Thus, the external toothed structure of the pin, which can be formed either on the first shaft of the electric machine, on the second shaft of the hydraulic unit or on the intermediate shaft, has an external toothed structure length and a pitch circle diameter. The external toothed structure length is the length of the teeth in the direction of extension of the shaft. It is now preferred that the ratio of pitch circle diameter to external toothed structure length is less than 1.2, particularly preferably less than 1.1 and quite particularly preferably less than 1.05. On the other hand, the ratio of pitch circle diameter to external toothed structure length should be at least 0.8, preferably at least 0.9 and particularly preferably at least 0.95. In a particularly preferred embodiment, the ratio of pitch circle diameter to external toothed structure length is between 0.95 and 1.05 and is particularly preferably equal to 1. An independent invention is also seen in this ratio of pitch circle diameter to external toothed structure length which can be claimed independently of the above-described solution for a system comprising electric machine and hydraulic unit.

Accordingly, an independent invention is seen in a hydraulic unit whose shaft has a pin with an external toothed structure, wherein the external toothed structure has an external toothed structure length and a pitch circle diameter whose ratio (i.e. the ratio of pitch circle diameter to external toothed structure length) lies in the previously described range.

It has been shown that in order to reduce the wear of the spline connection, it can alternatively or additionally be provided that the external toothed structure has a tolerance of class 07. The tolerance class here is defined in the standard ANSI B92.1 from 1996.

Accordingly, also proposed as an independent invention is a hydraulic unit which has a shaft with a pin having an external toothed structure, wherein the external toothed structure has a tolerance in class 07.

The ratios of pitch circle diameter to external toothed structure length described above, in particular in combination with the tolerance class of the internal toothed structure, have the effect that the wear of the spline connection is minimized.

The hydraulic unit is preferably embodied as a swash plate unit which can be operated as pump or motor. In a swash plate unit the deflection of the pin of the shaft projecting beyond the housing during operation is particularly great as a result of the forces acting on the shaft inside the swash plate pump. The pin of the shaft of the swash plate pump projecting beyond the housing of the swash plate pump is therefore inserted immediately and directly into a corresponding receptacle of the electric machine. Alternatively, the hydraulic unit that can be operated as pump or motor can be executed as an angled piston unit, a gear unit, a rotary vane unit or a screw spindle unit.

The spline connection is preferably a spline in which the tapered teeth of the external toothed structure engage in the internal toothed structure. Such a spline is defined, for example, in ANSI B92.1 from 1996.

BRIEF DESCRIPTION OF DRAWINGS

The invention and the technical background are explained hereinafter by reference to the figures as an example. In the figures schematically

DETAILED DESCRIPTION

Figure 1:
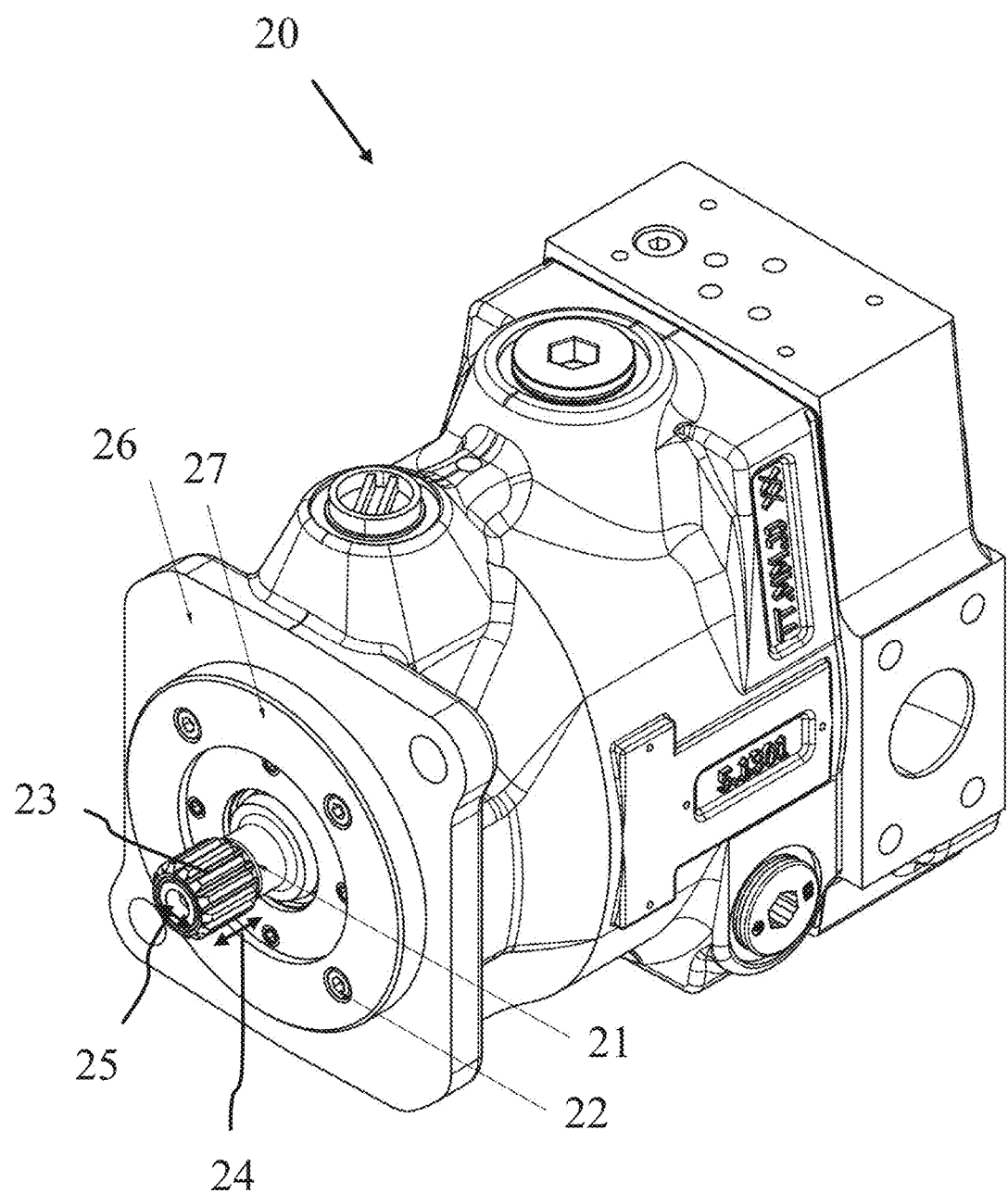
FIG. 1: shows a perspective view of a hydraulic unit.
Figure 3:
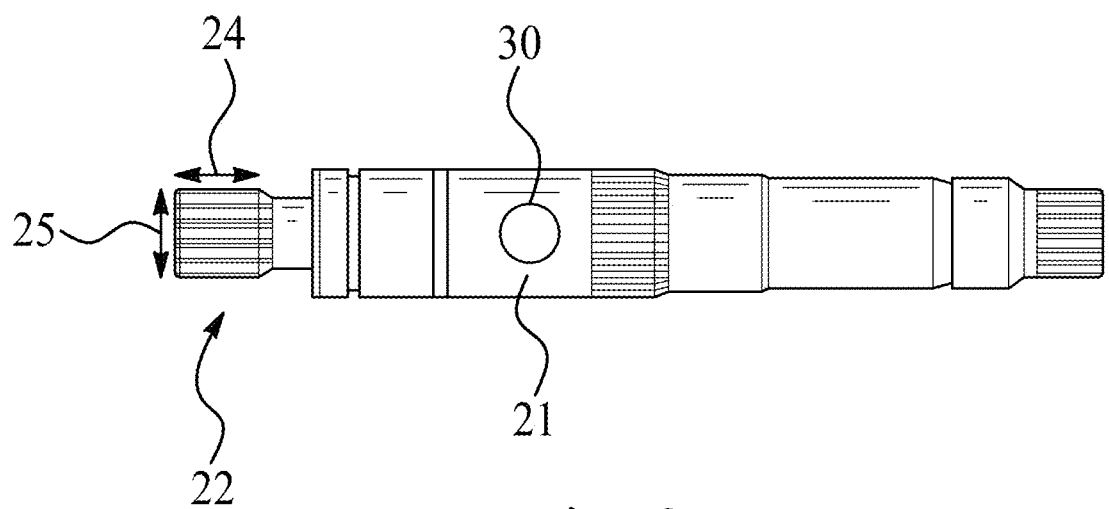
FIG. 3: shows a second shaft of the hydraulic unit.

The hydraulic unit 20 shown in FIG. 1 and configured as a swash plate pump comprises a housing 26 which has a cover cap 27. Mounted in the housing 26 is a shaft 21 which projects with a pin 22 beyond the cover cap 27. The pin 22 has an external toothed structure 23 with an external toothed structure length 24 and a pitch circle diameter 25. The shaft 21 with the pin 22 is also shown as a single component in FIG. 3.

Figure 2:
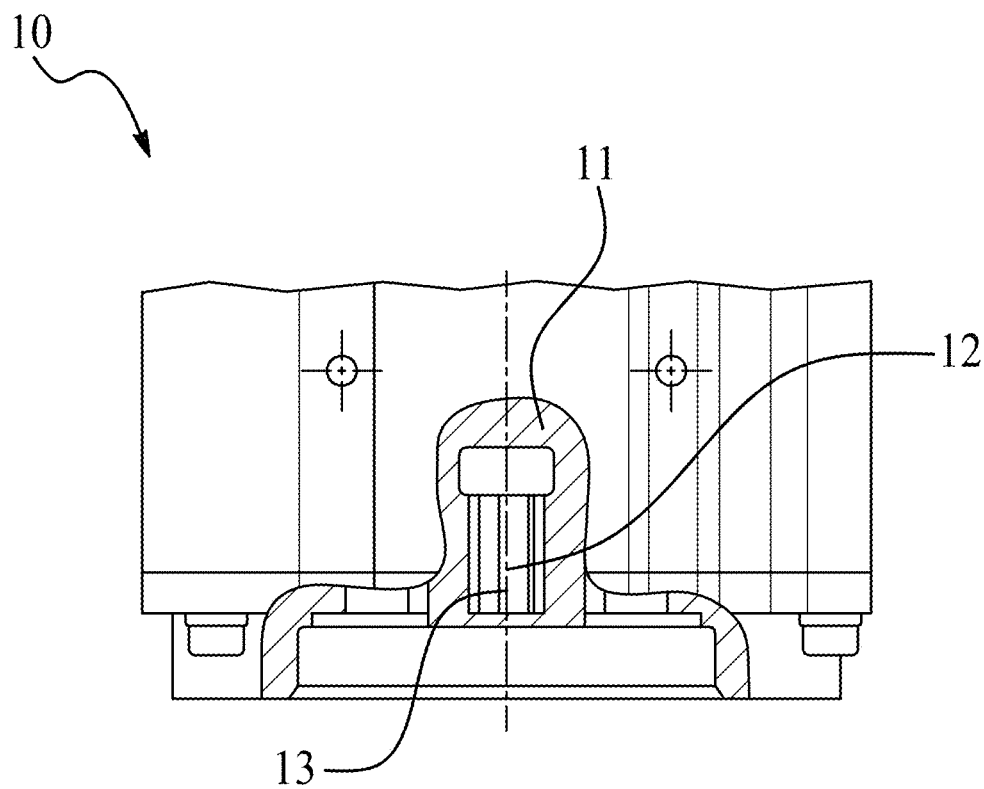
FIG. 2: shows a connecting region of an electrical unit.

FIG. 2 shows an electric machine 10 with its connecting region to the hydraulic element 20. A shaft 11 of the electric machine 10 has a receptacle 12 with an internal toothed structure 13.

The pin 22 of the shaft 21 of the hydraulic unit 20 is inserted in the receptacle 12 of the electric machine 10 to form a system. The shaft 11 of the electric machine 10 is thus connected directly to the shaft 21 of the electric hydraulic unit 20 forming a positive locking shaft-hub connection. Thus, no additional components are required to connect the shafts 21, 22 of the electric machine 10 and of the hydraulic unit 20 to one another.

In order that a tolerance deviation of the bearings of the shafts 11 and 21 can be compensated, the ratio of the pitch circle diameter 25 to external toothed structure length 24 is between 0.8 and 1.2 and preferably between 0.95 and 1.05. For the same reason the internal toothed structure 13 has a tolerance in class 07.

Figure 4:
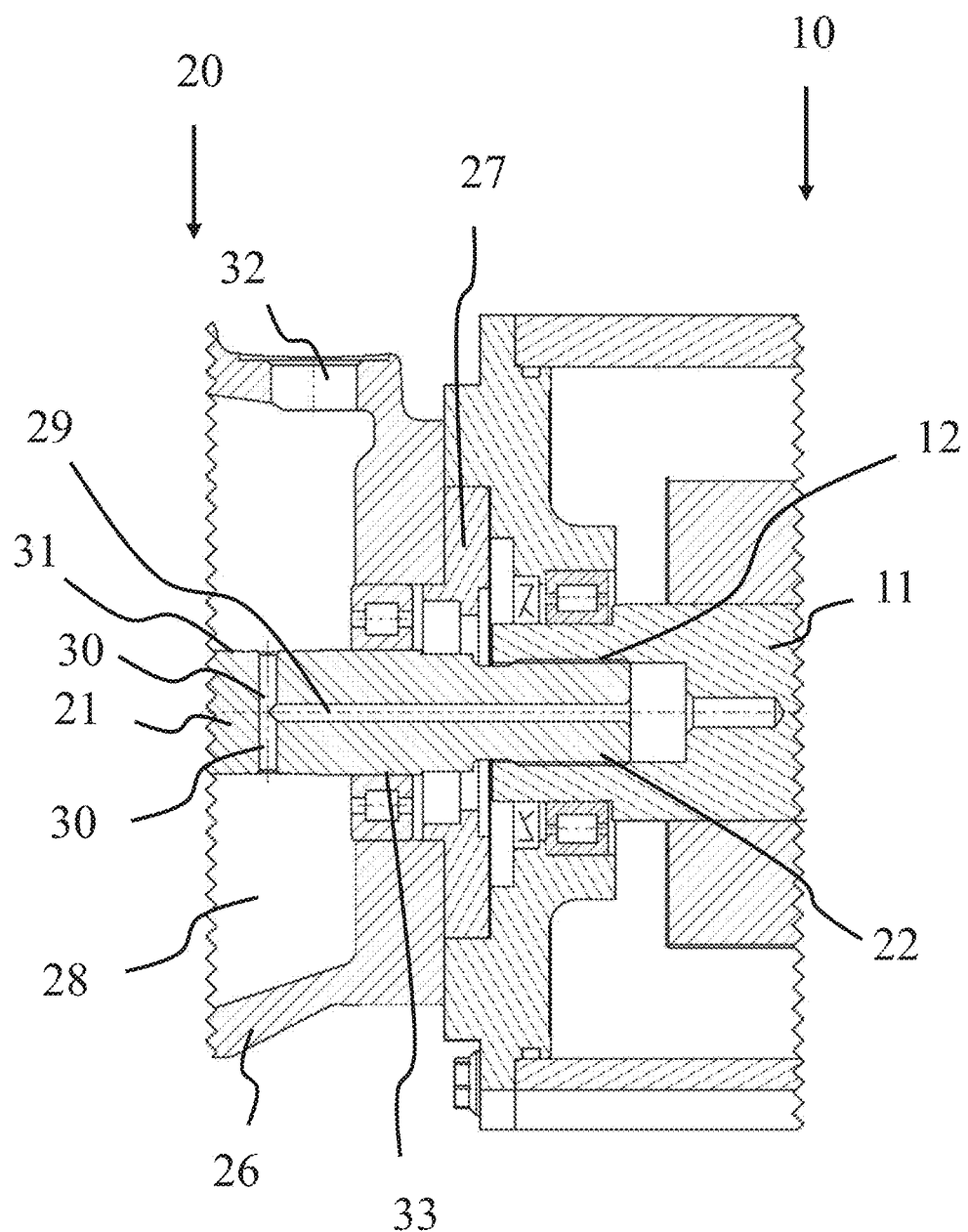
FIG. 4: shows a sectional view through a region of an exemplary embodiment of a system.
Figure 5:
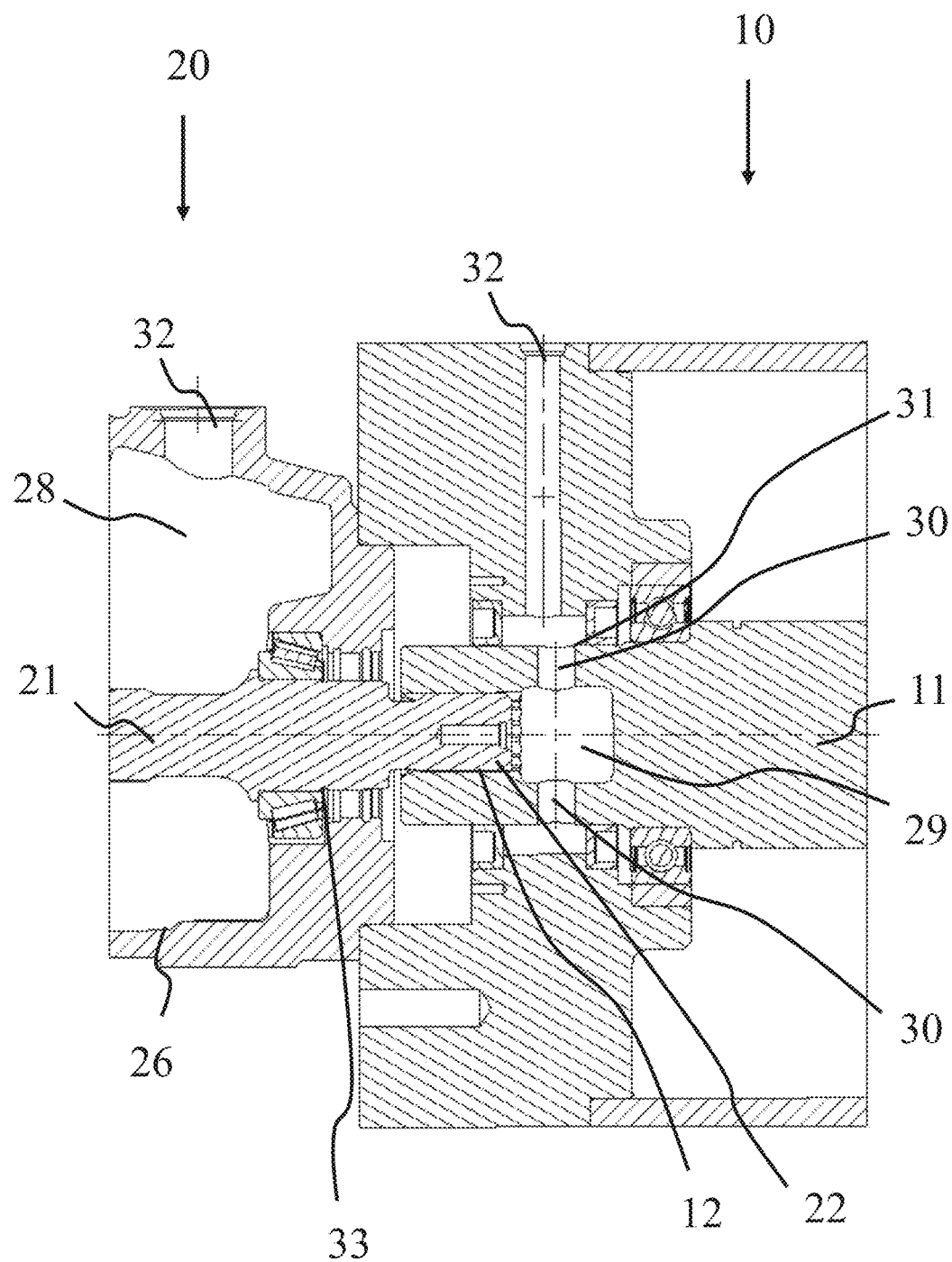
FIG. 5: shows a sectional view through a region of a further exemplary embodiment of a system

FIGS. 4 and 5 each show a region of a system consisting of an electric machine 10 and a hydraulic unit 20. Thus, the end of the hydraulic unit 20 facing the electric machine 10 and that of the hydraulic unit 20 facing the electric machine 10 are shown. In all the exemplary embodiments, it can be seen that the hydraulic unit 20 has a housing 26 which can comprise a cover cap 27 as a component. A leakage oil chamber 28 is formed inside the housing 26 into which hydraulic fluid can flow from the conveying chamber of the hydraulic unit along corresponding bearings (not shown) of the pump head. In addition, a leakage oil outlet 32 can be provided from which the leakage oil can emerge from the leakage oil chamber 28.

In addition, the receptacle 12 already described above can be seen at one end of the first shaft 11 in which the pin 22 of the second shaft 21 of the hydraulic unit 20 is inserted.

In the exemplary embodiment of FIG. 4, a central recess 29 configured as an axial channel is formed in the second shaft 21 of the hydraulic unit 20. This recess 29 configured as an axial channel is adjoined by two transverse channels 30 extending in the radial direction to an external circumference 31. The transverse channels 30 thus run from the end of the recess 29 into the leakage oil chamber 28. The recess 29 ends on the side facing the electric machine 10 on an end face of the second shaft 21.

In the exemplary embodiments shown in FIG. 5 a recess 29 is formed in the first shaft 11 of the electric machine 10 which adjoins the receptacle 12 for the pin 22. Starting from the recess 29 two transverse channels 30 extend to an external circumference 31 of the first shaft 11.

In both exemplary embodiments a passage 33 is formed along the external circumferential surface or through a bearing of the second shaft 21 of the hydraulic unit 20 through which leakage oil can flow from the leakage oil chamber 28 under appropriate pressure conditions. The exemplary embodiment of FIG. 5 provides a separate leakage oil outlet 32 in the electric machine 10 which is fluidically connected via the transverse channels 30 to the recess 29 in the first shaft 11.

During operation the first shaft 11 and the second shaft 21 rotate about their longitudinal axes. This has the result that leakage oil located in the transverse channels 30 is conveyed outwards as a result of centrifugal forces and a negative pressure is formed in the recess 29.

In the exemplary embodiment shown in FIG. 4 this again has the result that a negative pressure is also formed in the region of the receptacle 12 so that leakage oil flows from the leakage oil chamber 28 through the passage 33 and along the coupling point between the pin 22 and the receptacle 12. Thus, the coupling point between the pin 22 and the receptacle 12 is permanently lubricated. The leakage oil then enters into the recess 29 formed as an axial channel and passes from the transverse channels 30 back into the leakage oil chamber 28.

In the exemplary embodiments shown in FIG. 5, the rotation of the shafts 11, 21 also has the result that as a result of the centrifugal forces acting on the leakage oil in the transverse channels 30, a negative pressure is formed in the recess 29 with the result that leakage oil (hydraulic fluid) flows along the outer side of the second shaft 21 through the first passage 33 and along the coupling point between the receptacle 12 and the pin 22, with the result that the coupling point is lubricated. The fluid conveyed through the transverse channels 30 flows to the separate leakage oil outlet 32 of the electric machine 10.

Figure 6:
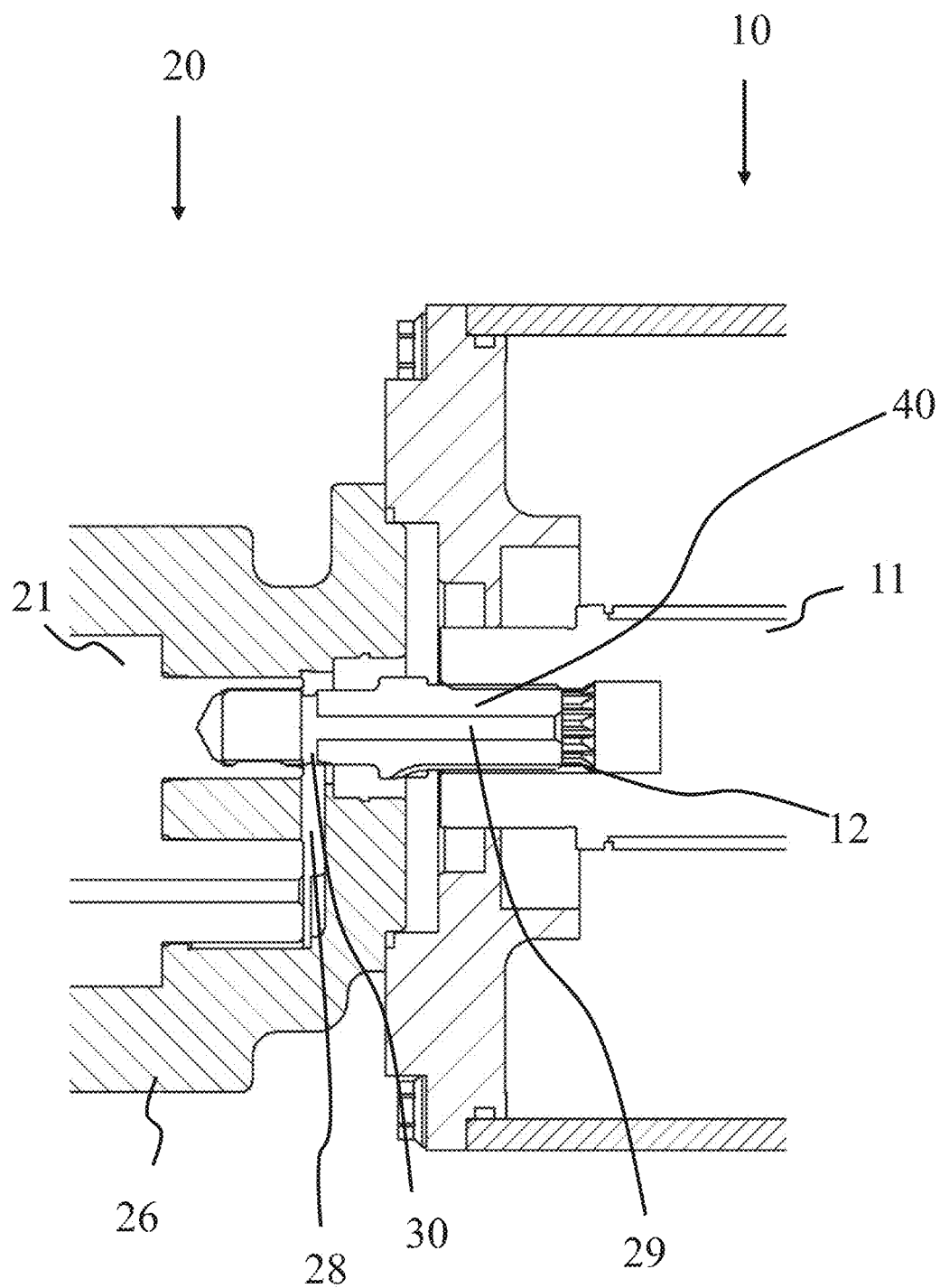
FIG. 6: shows a sectional view through a region of an even further exemplary embodiment of a system.

FIG. 6 shows a region of a further embodiment of a system consisting of an electric machine 10 and a hydraulic unit 20, which hydraulic unit 20 might be embodied as gear pump, for example. In the following mainly the differences with regard to the above described embodiments will be described.

In this embodiment the first shaft 11 of the electric machine 10 is indirectly connected to the second shaft 21 of the hydraulic unit 20. The first shaft 11 is connected to the second shaft 21 via an intermediate shaft 40, which is inserted with its one end having an external toothed structure into a receptacle 12 of the first shaft 11 and with its other end having also an external toothed structure into a receptacle formed within the second shaft 21. Accordingly, the intermediate shaft 40 connects the first shaft 11 and the second shaft 21 in a torque proof manner, so that a rotational movement of the first shaft 11 is transferred into a rotational movement of the second shaft 21. Thereby, a shaft-hub connection is formed between the first shaft 11 and the second shaft 21.

The intermediate shaft 40 has a central recess 29 which extends from and end face of the intermediate shaft 40 facing the first shaft 11 to transverse channels 30, the transverse channels 30 extending radially outwards towards an external circumference of the intermediate shaft 40. Within the housing 26 of the hydraulic unit 20 a leakage oil chamber 28 is formed, which surrounds the external circumference of the intermediate shaft 40 in an area, in which the transverse channels 30 exit.

During operation centrifugal forces acting on the leakage oil in the transverse channels 30 produce a negative pressure in the central recess 29, so that leakage oil from the leakage oil chamber 28 flows along the outer circumference of the intermediate shaft 40 into the receptacle 12 of the first shaft 11 and enters from there into the central recess 29. The leakage oil within the central recess 29 is expelled through the transverse channels 30 back into the leakage oil chamber 28. Accordingly, the positive locking connection between the first shaft 11 and the intermediate shaft 40 is lubricated by the leakage oil.

In order to enhance the leakage oil flow along the external circumference of a shaft a tooth of the external or internal toothed structure may within the shaft-hub connection may be omitted.

Thus, a compact system comprising electric machine and hydraulic unit is provided which can be operated with low maintenance.

REFERENCE LIST

10 Electric machine
11 First shaft
12 Receptacle
13 Internal toothed structure
20 Hydraulic unit
21 Second shaft
22 Pin
23 External toothed structure
24 External toothed structure length
25 Pitch circle diameter
26 Housing
27 Cover cap
28 Leakage oil chamber
29 Recess
30 Transverse channel
31 External circumference
32 Leakage oil outlet
33 Passage
40 Intermediate shaft

The invention claimed is:

1. A system comprising
an electric machine, wherein the electric machine comprises a first shaft, and
a hydraulic unit, wherein the hydraulic unit comprises a second shaft, wherein
the first shaft and the second shaft are connected to one another to form a shaft-hub connection,.
the shaft-hub connection comprises a central recess
the shaft-hub connection is fluidically connected to an interior of the hydraulic unit for lubrication and
the hydraulic unit comprises a leakage oil chamber wherein
the central recess adjoins at least one transverse channel, wherein the at least one transverse channel extends from the central recess to an external circumference of the shaft-hub connection,
wherein fluid located in the at least one transverse channel is subjected to a centrifugal force during operation of the system, whereby fluid is conveyed from the central recess into the leakage oil chamber surrounding the external circumference of the shaft, wherein fluid is sucked in as a result of the negative pressure formed thereby in the recess, so that a specific conveying direction of the fluid is predefined.

2. The system according to claim 1, wherein the first shaft and the second shaft are inserted into one another to form the shaft-hub connection.

3. The system according to claim 2, wherein the first shaft and/or the second shaft comprises the central recess, wherein the at least one transverse channel extends from the central recess to an external circumference of the shaft-hub connection.

4. The system according to claim 2, wherein the central recess and the at least one transverse channel are disposed in the second shaft.

5. The system according to claim 1, wherein the shaft-hub connection comprises an intermediate shaft for connecting the first shaft and the second shaft, wherein the central recess and the at least one transverse channel are formed in the intermediate shaft.

6. The system according to claim 1, wherein the at least one transverse channel extends from the central recess to the leakage oil chamber.

7. The system according to claim 6, wherein the central recess extends as an axial channel from the at least one transverse channel through the second shaft to the shaft-hub connection.

8. The system according to claim 5, wherein the central recess extends as an axial channel from the at least one transverse channel through the second shaft or through the intermediate shaft to a front-side end of the second shaft or of the intermediate shaft facing the first shaft.

9. The system according to claim 5, wherein the first shaft has a receptacle for the second shaft or for the intermediate shaft and wherein the central recess formed in the first shaft adjoins the receptacle and wherein the at least one transverse channel is formed in the first shaft.

10. The system according to claim 9, wherein a front-side end face of the first shaft is sealed with respect to the hydraulic unit.

11. The system according to claim 1, wherein the shaft-hub connection is connected fluidically outside the second shaft via at least one passage to the leakage oil chamber of the hydraulic unit.

12. The system according to claim 1, wherein the hydraulic unit is a swash plate unit, angled piston unit, gear pump unit, rotary vane unit or screw spindle unit.

13. The system according to claim 1, wherein a leakage oil outlet emerges from the leakage oil chamber.

14. A system comprising
an electric machine, wherein the electric machine comprises a first shaft, and
a hydraulic unit, wherein the hydraulic unit comprises a second shaft, wherein
the first shaft and the second shaft are connected to one another to form a shaft-hub connection,.
the shaft-hub connection comprises a central recess
the shaft-hub connection is fluidically connected to an interior of the hydraulic unit for lubrication and
the hydraulic unit comprises a leakage oil chamber;
wherein the central recess adjoins at least one transverse channel, wherein the at least one transverse channel extends from the central recess to an external circumference of the shaft-hub connection; and
wherein the at least one transverse channel extends from the central recess to the leakage oil chamber.

15. The system according to claim 14, wherein the central recess extends as an axial channel from the at least one transverse channel through the second shaft to the shaft-hub connection.

* * * * *